US007379265B2

(12) United States Patent
Wang et al.

(10) Patent No.: US 7,379,265 B2
(45) Date of Patent: May 27, 2008

(54) DISC DRIVE AIR BORNE FILTERING CHANNEL

(75) Inventors: (Peter) Fei Wang, Savage, MN (US); Stephen P. LeClair, Burnsville, MN (US); Steven D. Knopp, Bloomington, MN (US); Robert W. Mead, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/175,967

(22) Filed: Jun. 20, 2002

(65) Prior Publication Data

US 2003/0137769 A1    Jul. 24, 2003

Related U.S. Application Data

(60) Provisional application No. 60/352,083, filed on Jan. 24, 2002.

(51) Int. Cl.
*G11B 33/14*    (2006.01)

(52) U.S. Cl. .................................. 360/97.02

(58) Field of Classification Search ............. 360/97.02, 360/97.03, 97.04, 97.01
See application file for complete search history.

(56) References Cited

U.S. PATENT DOCUMENTS

| 4,369,475 A | 1/1983 | Ho et al. ........................ 360/97 |
| 4,587,645 A * | 5/1986 | Wong et al. ............. 360/97.02 |
| 4,594,626 A * | 6/1986 | Frangesh .................. 360/97.02 |
| 4,647,997 A | 3/1987 | Westwood ................... 360/105 |
| 4,780,776 A | 10/1988 | Dushkes ....................... 360/98 |
| 5,101,305 A * | 3/1992 | Ohkita et al. ............ 360/97.02 |
| 5,406,431 A * | 4/1995 | Beecroft .................. 360/97.02 |
| 5,995,323 A | 11/1999 | Jinbo et al. ............. 360/97.02 |
| 6,008,965 A | 12/1999 | Izumi et al. ............. 360/97.03 |
| 6,008,966 A | 12/1999 | Forbord et al. .......... 360/97.03 |
| 6,266,203 B1 | 7/2001 | Street et al. .................. 360/69 |
| 6,266,208 B1 * | 7/2001 | Voights .................. 360/97.02 |
| 6,369,978 B1 * | 4/2002 | Shimizu et al. ........... 360/97.03 |
| 6,385,006 B1 * | 5/2002 | Kaczeus et al. .......... 360/97.01 |
| 6,507,452 B1 * | 1/2003 | Bae et al. ................ 360/97.02 |
| 2002/0044376 A1 * | 4/2002 | Serizawa et al. ........ 360/97.02 |
| 2002/0071203 A1 * | 6/2002 | Nakamoto et al. ....... 360/97.02 |

* cited by examiner

*Primary Examiner*—Tianjie Chen
(74) *Attorney, Agent, or Firm*—Westman, Champlin & Kelly, P.A.

(57) ABSTRACT

A base support member for a disc drive is provided. The base support member includes a disc support cavity configured to house and support a spinning disc, and a filter support cavity configured to house and support a filter. The base support member also includes at least one surface that defines an airborne filtering channel that is generally disposed within the filter support cavity of the base support member. The airborne filtering channel has an inlet opening positioned in a first location proximate the disc support cavity and an outlet opening positioned in a second location proximate the disc support cavity. The airborne filtering channel is configured to receive a flow of air from the spinning disc at the inlet opening, pass the flow of air through the filter cavity and to discharge the flow of air at the outlet opening.

15 Claims, 4 Drawing Sheets

DISC DRIVE AIR BORNE FILTERING CHANNEL

CROSS-REFERENCE TO RELATED APPLICATION

This application claims priority from U.S. Provisional Application No. 60/352,083 filed on Jan. 24, 2002 and entitled DISC DRIVE AIR BORNE FILTERING CHANNEL.

FIELD OF THE INVENTION

The present invention relates generally to disc drives, and more particularly but not by limitation to an improved shroud that protects the disc pack of the disc drive from wind induced flutter.

BACKGROUND OF THE INVENTION

Disc drives are common data storage devices. A typical disc drive includes a rigid housing or deck that encloses a variety of disc drive components. The components include one or more discs having data surfaces coated with a magnetizable medium for storage of digital information in a plurality of circular, concentric data tracks. The discs are mounted on a spindle motor that causes the discs to spin and the data surfaces of the discs to pass under respective hydrodynamic or aerodynamic bearing disc head sliders. The sliders carry transducers, which write information to and read information from the data surfaces of the discs.

As the disc rotates, the disc drags air in a direction approximately parallel to the tangential velocity of the disc. With increasing disc capacity and evolving disc drive performance requirements, it has become desirable to increase the rotational speed of the discs in the disc drive. During disc drive operation, increases in disc rotational speed can cause windage-related excitation of the discs and other mechanical parts located within the disc drive housing.

One way to reduce windage-related interference is to include a shroud around the disc pack to substantially confine airborne filtering to the disc pack area. With higher disc capacity and performance requirements, most hard disc drives include a disc shroud feature around the disc pack to streamline the air flow and reduce the resonance from disc modes. At the same time, a lot of modern drives have an air borne filtering mechanism using a filter residing inside the disc drive in the middle of the main air flow path. In this kind of design, the main stream air flow around the disc shroud is divided into two branches, one routing to the filter area and the other around the disc, and then merging back again shortly as one branch in the disc shroud area. The design helps the particle clean up rate, but breaks the intact disc round shroud. As a result, more turbulence is introduced causing higher resonance from disc mode and bulk windage. It is known in the art that the non-repeatable runout (NRRO) will be improved if the shroud openings for the air filtering is blocked. However, with the filter area of the shroud blocked, the air borne clean up rate will be significantly worse.

Known disc drive designs allow, and in some instances encourage, the flow of air out of the disc pack area. This flow of air that escapes the disc pack area is typically able to indiscriminately re-enter the disc pack area, thereby causing the disc pack to experience windage-induced turbulence on a random basis. This windage-induced turbulence can have a negative impact on disc pack performance during critical read-write operations.

Various shrouds and baffles have been proposed to control air flow in a disc drive. For example, shrouds or baffles are used to control air movement at the edge of the disc to prevent disc flutter and to aid in filtering the air. In addition, filters supported in airways along the edge of disc housings are known in the art.

Embodiments of the present invention address these and other problems, and offer other advantages over the prior art.

SUMMARY OF THE INVENTION

The present invention is a channel around the disc shroud for the disc pack of a disk drive. The channel permits air flow around disc pack to be diverted into two flows to bypass air-filtering into this channel and eliminates the immediate merge of the air flow in the disc pack region after air filtering.

One embodiment of the present invention pertains to a base support member for a disc drive. The base support member includes a disc support cavity configured to house and support a spinning disc, and a filter support cavity configured to house and support a filter. The base support member also includes at least one surface that defines an airborne filtering channel that is generally disposed within the filter support cavity of the base support member. The airborne filtering channel has an inlet opening positioned in a first location proximate the disc support cavity and an outlet opening positioned in a second location proximate the disc support cavity. The airborne filtering channel is configured to receive a flow of air from the spinning disc at the inlet opening and to discharge the flow of air at the outlet opening.

Another embodiment pertains to a method of channeling airborne filtering created by a disc that is configured to rotate within a housing of a disc drive. The method includes the steps of forming the housing, providing an airborne filtering inlet opening within the housing and positioning the airborne filtering inlet opening in a first location proximate an outside diameter of the disc. The method also includes the steps of providing an airborne filtering outlet opening within the housing and positioning the airborne filtering outlet opening in a second location proximate the outside diameter of the disc, the first location being displaced along the outside diameter from the second location. The method also includes the steps of providing an airborne filtering path within the housing and positioning the airborne filtering path so as to provide airborne filtering communication between the airborne filtering inlet opening and the airborne filtering outlet opening. In addition, the method includes the steps of providing a filter housing within the housing and positioning the filter housing within the airborne filtering communication between the airborne filtering inlet opening and the airborne filtering outlet opening.

Another embodiment pertains to a disc drive that includes a rotatable storage disc and a disc head slider adapted to access data stored on a surface of the disc. The disc drive also includes an actuator mechanism for moving the disc head slider across the surface of the disc. The disc drive further includes read/write circuitry, which is coupled to the disc head slider. The disc drive further includes a filter. In addition, the disc drive includes a base support member for supporting the filter. The disc drive also includes means for guiding airborne filtering within the base support member during operation of the disc drive.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
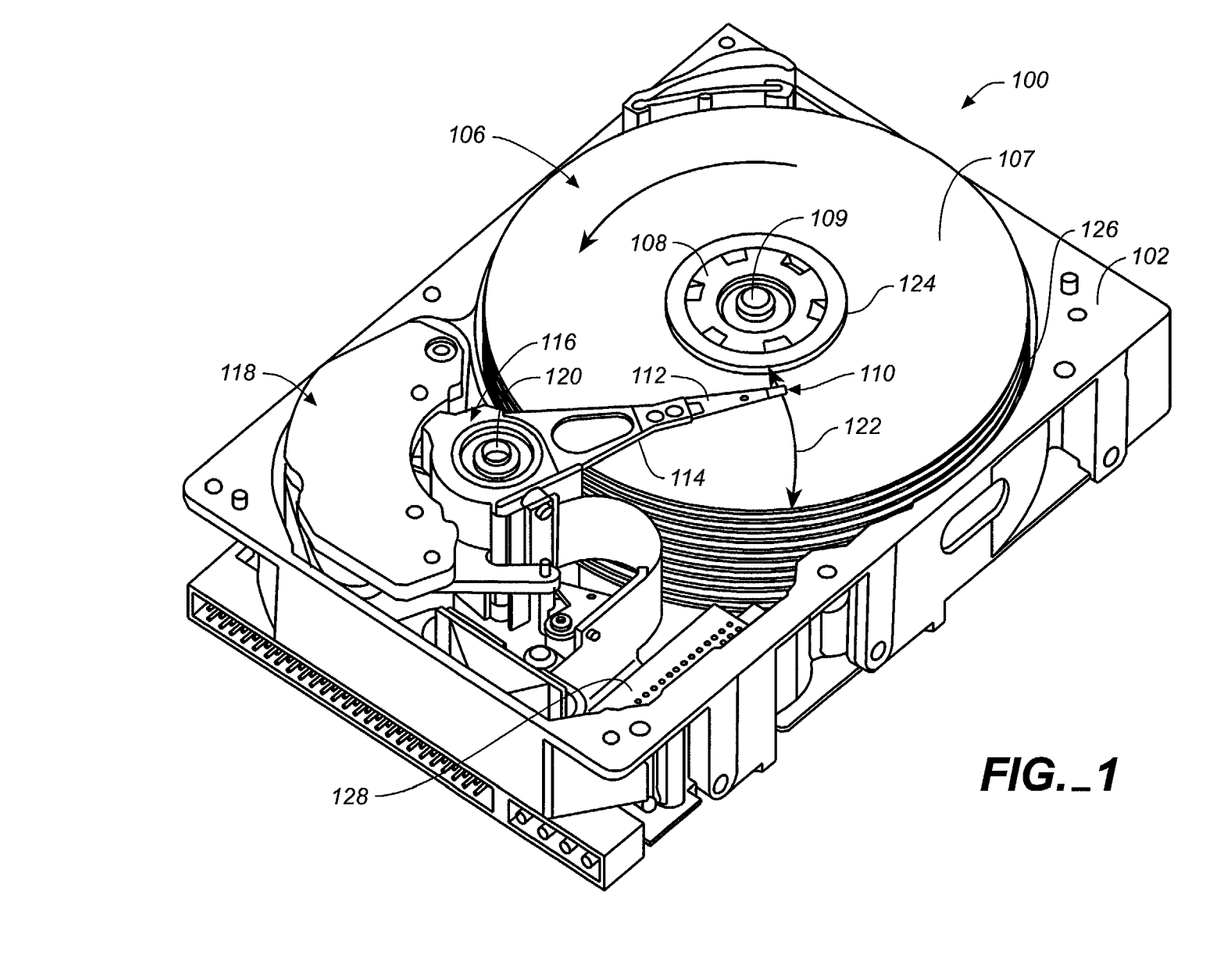
FIG. 1 is an isometric view of a disc drive.

FIG. 1 is an isometric view of a disc drive 100 in which embodiments of the present invention are useful. Disc drive 100 includes a housing with a base support member 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 128 based on signals generated by sliders 110 and a host computer (not shown). Other types of actuators can also be used, such as linear actuators. Filter 130 separates contaminants from the air within disc drive 100. Shroud 132 is disposed between disc pack 106 and filter 130.

In one embodiment, during operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic or aerodynamic lifting force that counteracts the load force provided by suspensions 112 and causes the sliders 110 to lift and fly above or in close proximity to the disc surfaces.

Base support member 102 is illustratively a rigid housing that holds the various internal features of disc drive 100. During operation of disc drive 100, the rotation of discs 107 induces significant air movement within base support member 102. This air movement can cause sliders 110 to experience windage-induced turbulence, thereby compromising the flight performance of the sliders and the data transfer effectiveness of their associated read/write heads. Some of the turbulence experienced by sliders 110 results when the rotation of discs 107 causes air to be temporarily thrust out of the disc pack 106 area and allowed to indiscriminately re-enter the disc pack 106 area. Also, sliders 110 can experience an increased resonant amplitude as a result of windage-induced excitation of mechanical components, such as discs 107, voice coil motor 118, actuator 116, track accessing arms 114, suspensions 112 and other mechanical parts within base support member 102. As disc drive spindle speeds are increased in order to increase the speed at which discs 107 rotate, the likelihood that sliders 110 will experience significant windage-induced turbulence also increases.

A method to resolve this problem is to use a separate air bypassing flow for the air borne filtering to optimize the rounding feature length of the shroud. Specifically, a built-in deck feature is designed to divert the air around disc pack 106 into two flows to bypass air filtering flow into a separate channel and eliminate the immediate merge of the air flow after filtering. Adding a separate bypassing channel inside the deck creates a double shroud wall feature around part of the disc pack 106 called an air borne filtering channel. This air borne filter channel is long enough so the flow passing through the channel will not merge back to the air around the disc pack immediately. Instead, the air flow in the filter channel is directed away from the disc pack region and does not merge back to the air flow around disc pack 106 in the upstream air flow area.

Figure 2:
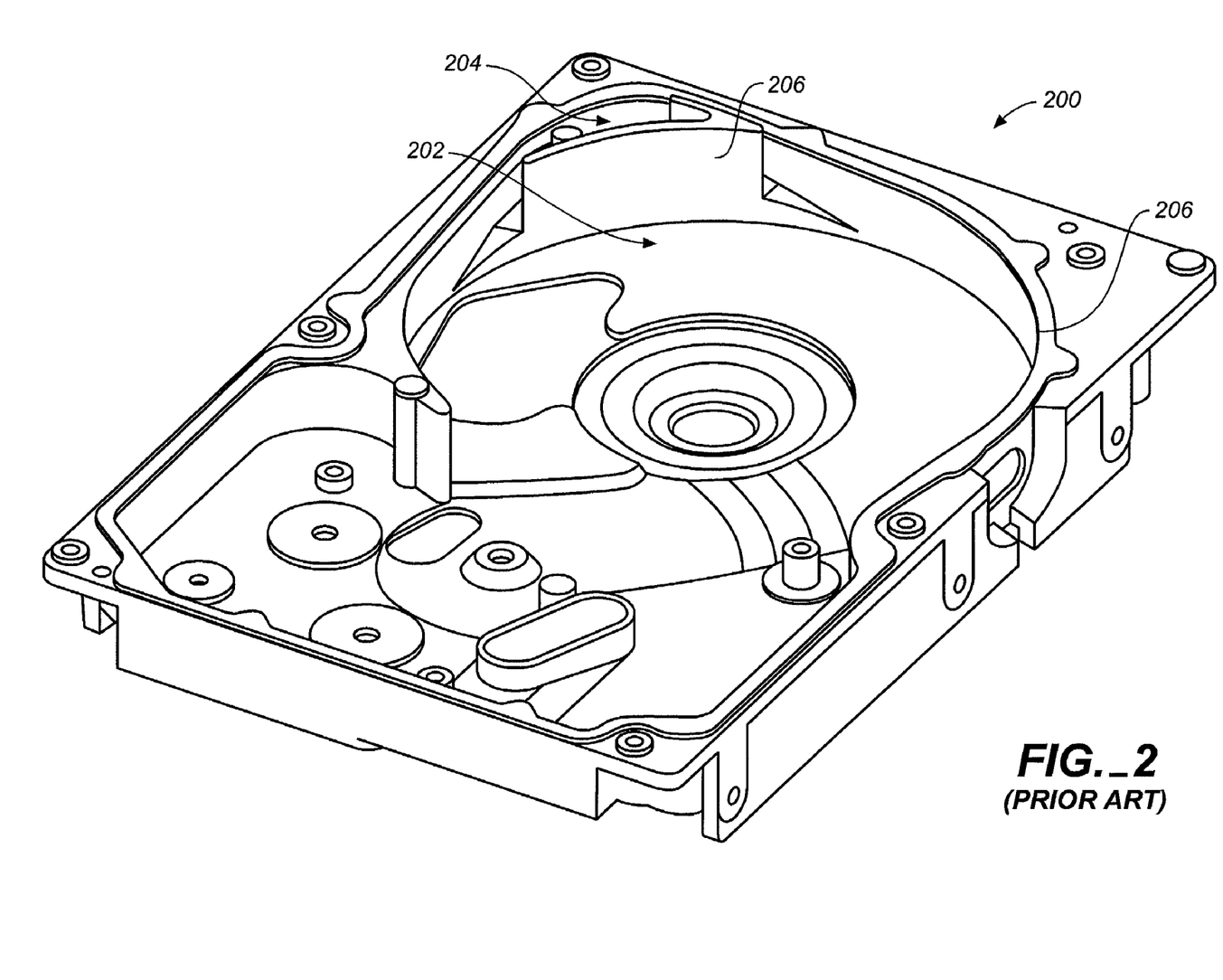
FIG. 2 is a perspective view of a base support member for a disc drive, as is known in the prior art.

To better illustrate the invention, a known base support is first discussed with respect to FIG. 2, a perspective view of a known base support member 200. Base support 200 is configured for incorporation into a disc drive system. For example, base support member 200 could be substituted for base support member 102 within disc drive 100 (FIG. 1). Base support member 200 has a disc support cavity 202 configured to house and support at least one rotatable disc. Also included is a filter support cavity 204 configured to house and support the filter. Base support member 200 further includes a shroud feature 206. Shroud feature 206 partially encloses the disc support cavity 202, but a significant gap is left open in areas proximate to filter support cavity 204.

When base support member 200 is utilized within an operational disc drive system, the rotation of the disc or discs housed within support cavity 202 will cause air to be temporarily thrust out of cavity 202 and into filter support cavity 204. That same air is allowed to substantially indiscriminately re-enter disc support cavity 202, potentially having an adverse effect on the performance of disc head sliders and their associated transducers operating within the disc drive system. Also, when air flows out of disc support cavity 202 and into filter support cavity 204, a slider may experience an increased resonant amplitude as a result of windage-induced excitation of the disc drive's sensitive mechanical components (e.g., the discs, the voice coil motor, the actuator, the track accessing arms, the suspensions and other mechanical parts). In addition, shroud feature 206 will inherently guide a significant amount of airborne filtering directly at the disc head sliders and their sensitive suspension systems, which can potentially have an adverse effect on slider performance.

Figure 3:
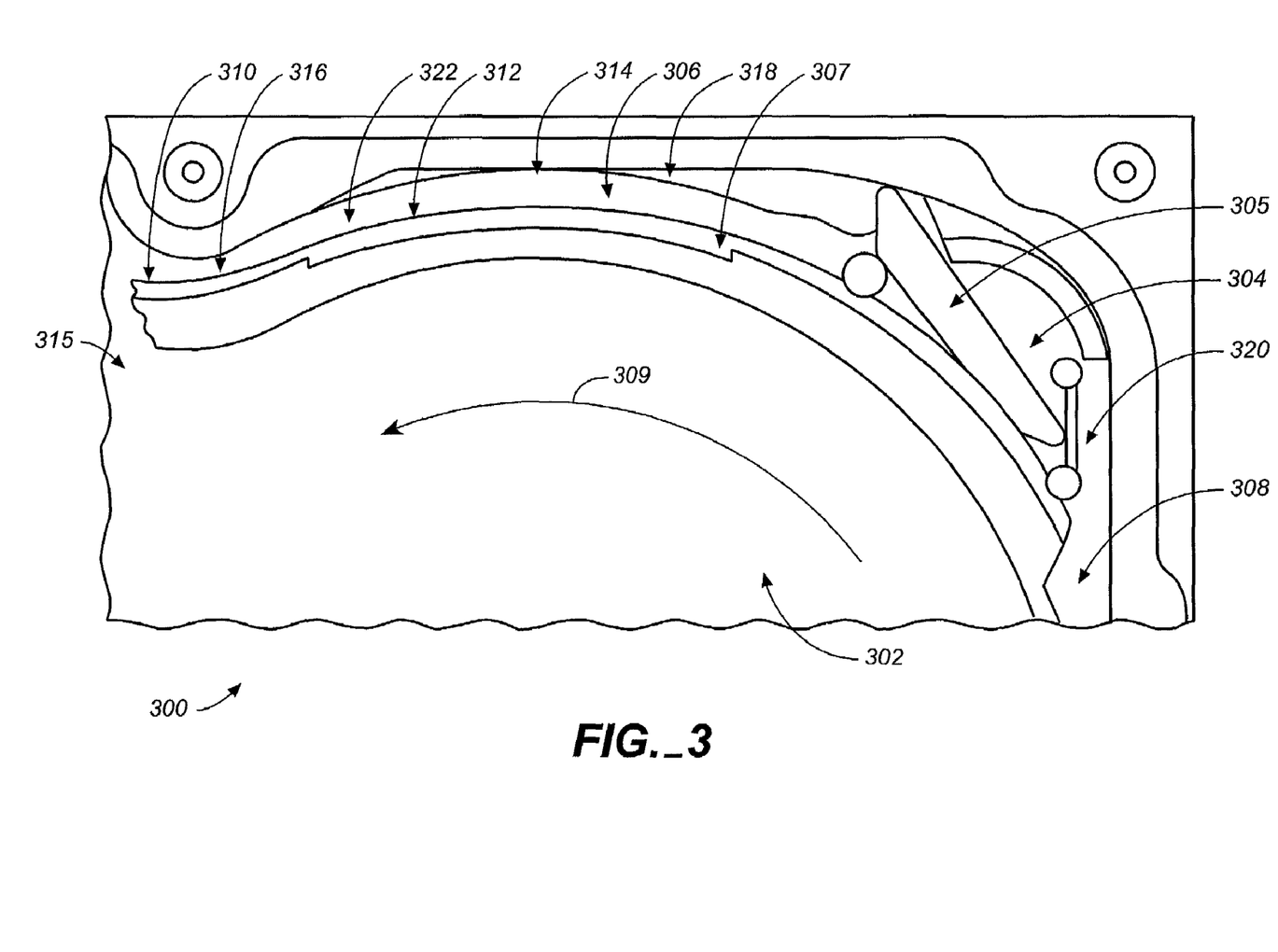
FIG. 3 is a perspective view of a portion of a base support member incorporating an embodiment of the present invention.

FIG. 3 is a perspective view of a portion of a base support member 300 for a disc drive, in accordance with an illustrative embodiment of the present invention. Base support 300 is configured for incorporation into a disc drive system. For example, base support member 300 could be substituted for base support member 102 within disc drive 100 (FIG. 1).

Base support member 300 includes a disc support cavity 302 configured to house and support at least one rotatable disc. During operation of an associated disc drive system, the disc (or discs) spin or rotate about an axis in a manner similar to discs 107 described above in relation to FIG. 1. Base support member 300 also includes a filter support cavity 304, which is configured to house and support a filter 305.

Base support member 300 further comprises an airborne filtering channel 306 a part of which defines filter support cavity 304. Shroud 307 is disposed between disc support cavity 302 and airborne filtering channel 306. Airborne filtering channel 306 has an inlet opening 308 positioned in a first location proximate disc supporting cavity 302 and an outlet opening 310 positioned in a second location proximate disc supporting cavity 302. Airborne filtering channel 306 is generally configured to channel a flow of air that is created by a spinning disc (or discs) spinning in the direction indicated by arrow 309 during operation of a disc drive system within which base support member 300 has been incorporated. Airborne filtering channel 306 illustratively receives a flow of air from the spinning disc or discs at inlet opening 308, channels the air flow through the airborne filter through channel 306 (including filter support cavity 304), and discharges the filtered flow of air at outlet opening 310 in a direction generally away from the discs.

Airborne filtering channel 306 is partially formed by a wall 312 having an outwardly facing surface, wherein "outwardly," means generally away from the interior portions of base support member 300. As illustrated, wall 312 is integrally formed as part of base support member 300. In accordance with another embodiment, however, wall 312 is a separate component that is attached about disc support cavity 302 of base support member 300. Airborne filtering channel 306 is also partially formed by a wall 314 having an inwardly facing surface, wherein "inwardly," means generally towards the interior portion of base support member 300. As illustrated, wall 314 is part of a protrusion 318. In accordance with one embodiment, protrusion 318 is an integrally formed part of base support member 300. In accordance with another embodiment, however, protrusion 318 is a separate component that is attached to base support member 300.

Referring to FIG. 3, the inwardly and outwardly facing surfaces of walls 312 and 314 face one another, are spaced apart from one another, and cooperate to form the walls of airborne filtering channel 306. Base support member 300 has an interior floor 315. Airborne filtering channel 306 illustratively includes a floor portion 416. In accordance with one embodiment, floor portion 416 is generally contiguous and coplanar with floor 315. In accordance with one embodiment, when a top cover (not shown) is placed over base support member 300, air channel 306 has a top enclosure surface that is provided by that top cover.

It should be pointed out that airborne filtering channel 306 may be formed utilizing structure other than the specifically illustrated channel. For example, airborne filtering channel 306 could be formed utilizing a tubular member (having a single inner tubular surface) that is disposed about filter support cavity 304. The tubular member could have inlet and outlet openings similar to the airborne filtering channel pictured in FIG. 3. Similar airborne filtering channels having other structural manifestations should also be considered within the scope of the present invention.

Filter support cavity 304 illustratively has a filter side 320 and a clear side 322. Filter side 320 is generally the side of filter support cavity 304 near where filter 305 is supported. Clear side 322 is generally the side of filter support cavity 304 away from where filter 305 is supported. Inlet opening 308 is generally positioned proximate disc support cavity 302 on filter side 320 of filter support cavity 304. Outlet opening 310 is generally positioned proximate disc support cavity 302 on clear side 322 of filter support cavity 304 and at the end of air channel 306.

In accordance with another embodiment, configurations of inlet opening 308 and outlet opening 310 are switched to accommodate opposite disc rotation within a disc drive system that incorporates base support member 300 (e.g., inlet opening 308 is on clear side 322). In accordance with yet another embodiment, inlet opening 308 is formed by surfaces so as to be aerodynamically shaped to encourage a pattern of airborne filtering from a disc spinning within disc support cavity 302 to airborne filtering channel 306.

Figure 4:
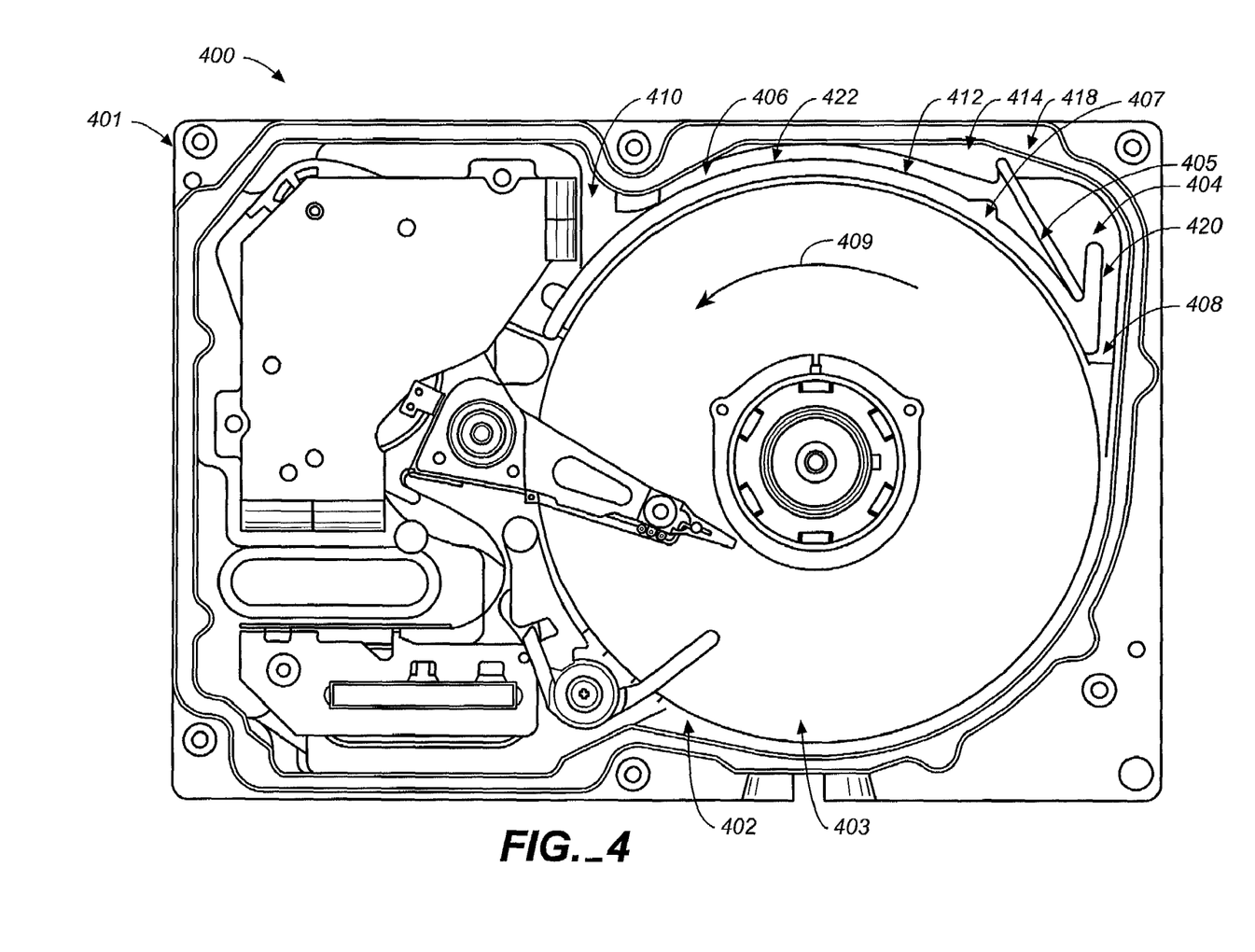
FIG. 4 is a plan view of a disc drive incorporating an embodiment of the present invention.

FIG. 4 is a plan view of a disc drive 400, in accordance with an illustrative embodiment of the present invention. Base support 401 is configured for incorporation into a disc drive system. For example, base support member 401 could be substituted for base support member 102 within disc drive 100 (FIG. 1).

Base support member 401 includes a disc support cavity 402 configured to house and support disc pack 403. During operation of an associated disc drive system, the disc (or discs) spin or rotate about an axis in a manner similar to discs 107 described above in relation to FIG. 1. Base member 401 also includes a filter support cavity 404, which is configured to house and support filter 405.

Base support member 401 further comprises an airborne filtering channel 406 that is generally disposed within filter support cavity 404. Shroud 407 is disposed between disc support cavity 402 and airborne filtering channel 406. Airborne filtering channel 406 has an inlet opening 408 positioned in a first location proximate disc supporting cavity 402 and an outlet opening 410 positioned in a second location proximate disc supporting cavity 402. Airborne filtering channel 406 is generally configured to channel a flow of air that is created by a spinning disc (or discs), spinning in the direction indicated by arrow 409 during operation of a disc drive system within which base support member 401 has been incorporated. Airborne filtering channel 406 illustratively receives a flow of air from the spinning disc or discs at inlet opening 408, channels the air flow through channel 406, and discharges the flow of air at outlet opening 410 in a direction generally away from the discs.

Airborne filtering channel 406 is partially formed by a wall 412 having an outwardly facing surface, wherein "outwardly," generally means away from the interior portions of base support member 401. Airborne filtering channel 406 is also partially formed by a wall 414 having an inwardly facing surface, wherein "inwardly," generally means towards the interior portions of base support member 401. As illustrated, wall 414 is part of a protrusion 418 that is generally disposed proximate to filter support cavity 404.

Filter support cavity 404 illustratively has a filter side 420 and a clear side 422. Filter side 420 is generally the side of filter support cavity 404 upstream along the airborne filtering path of where filter 405 is supported. Clear side 422 is generally the side of filter support cavity 404 downstream along the airborne filtering path of where filter 405 is supported. Inlet opening 408 is generally positioned proximate disc support cavity 402 on filter side 420 of filter support cavity 404. Outlet opening 410 is generally positioned proximate disc support cavity 402 on clear side 422 of filter support cavity 404.

In accordance with another embodiment, inlet opening 408 is formed by surfaces so as to be aerodynamically shaped to encourage a pattern of airborne filtering from a disc spinning within disc support cavity 402 to airborne filtering channel 406.

The present invention can be summarized in reference to the figures. In some embodiments a base support member (such as 300) for a disc drive (such as 100), comprises a disc support cavity (such as 302) configured to house and support a spinning disc (such as 107) and a filter support cavity (such as 304) configured to house and support a filter (such as 130). The embodiments also include at least one surface that defines an airborne filtering channel (such as 306) that is generally disposed within the filter support cavity of the base support member, the airborne filtering channel having an inlet opening (such as 308) positioned in a first location proximate the disc support cavity and an outlet opening positioned (such as 310) in a second location proximate the disc support cavity. The embodiments also include that the airborne filtering channel is configured to receive a flow of air from the spinning disc at the inlet opening and to discharge the flow of air at the outlet opening generally away from the spinning disc.

Some embodiments further include that the at least one surface comprises a first wall having an inwardly facing surface (such as 312); and a second wall having an outwardly facing surface (such as 314), the outwardly facing surface being spaced apart from and facing the inwardly facing surface, the inwardly and outwardly facing surfaces cooperating to form the airborne filtering channel (such as 306) there between.

An embodiment further includes that the first wall (such as 312) is integrally formed as part of the base support member (such as 300).

An embodiment further includes that the second wall (such as 314) is part of a protrusion (such as 318), the protrusion being an integrally formed part of the base support member (such as 300).

An embodiment further includes that the second wall (such as 314) is part of a protrusion (such as 318), the protrusion being attached to the base support member (such as 300).

Some embodiments further include that the filter support cavity (such as 304) has a filter side (such as 320) and a clear side (such as 322). Some embodiments further include that the inlet opening (such as 308) of the airborne filtering channel (such as 306) is generally positioned proximate the disc support cavity (such as 302) on one of the filter and clear sides of the filter support cavity. Some embodiments further include that the outlet opening (such as 310) of the airborne filtering channel is generally positioned proximate the disc support cavity on the other of the filter and clear sides of the filter support cavity.

Some embodiments further include that the base support member (such as 300) has the inlet (such as 308) opening aerodynamically shaped to encourage a pattern of airborne filtering from the spinning disc (such as 107) to enter the airborne filtering channel (such as 306).

Some embodiments further include that the base support member (such as 300) having the inlet opening (such as 308) including a shroud portion.

Some embodiments further include, a disc drive (such as 100) comprised of a base support member (such as 300) for a disc drive (such as 100), comprised of a disc support cavity (such as 302) configured to house and support a spinning disc (such as 107) and a filter support cavity (such as 304) configured to house and support a filter (such as 130). The embodiments also include at least one surface that defines an airborne filtering channel (such as 306) that is generally disposed within the filter support cavity of the base support member, the airborne filtering channel having an inlet opening (such as 308) positioned in a first location proximate the disc support cavity and an outlet opening positioned (such as 310) in a second location proximate the disc support cavity. The embodiments also include that the airborne filtering channel is configured to receive a flow of air from the spinning disc at the inlet opening and to discharge the flow of air at the outlet opening generally away from the spinning disc. The embodiments also include a base support member (such as 300), a disc (such as 107) that is supported within the base support member, has an outside diameter and is rotatable about a central axis (such as 109); and a channel (such as 306). The embodiments also include that the channel is nearly the length of the disc support member (such as 302), wherein an inlet opening (such as 308) is positioned in a first location proximate the outside diameter of the disc and an outlet opening (such as 310) is positioned in a second location proximate the outside diameter of the disc, pointing away from the disc, the first location preceding the second location relative to rotation of the disc.

Some embodiments further include that the disc (such as 107) is rotatably supported within the disc support cavity (such as 302) and the airborne filtering channel is generally disposed within the filter support cavity (such as 304).

Another embodiment further includes that the filter support cavity (such as 304) has a filter side (such as 320) and a clear side (such as 322). The embodiment further includes that the inlet opening (such as 308) of the airborne filtering channel (such as 306) is generally positioned proximate the outside diameter of the disc on one of the filter and clear sides of the filter support cavity. The embodiment further includes that the outlet opening (such as 310) of the airborne filtering channel is generally positioned proximate the outside diameter of the disc on the other of the filter and clear sides of the filter support cavity.

An embodiment further includes that the inlet opening (such as 308) is aerodynamically shaped to encourage a pattern of airborne filtering from the spinning disc (such as 107) to the airborne filtering channel (such as 306).

An embodiment further includes that the inlet opening (such as 308) includes a shroud portion.

In some embodiments a method of channeling airborne filtering created by a disc (such as 107) that is configured to rotate within a housing (such as 102) of a disc drive (such as 100), comprises forming the housing, operatively securing the disc within the housing and providing an airborne filtering inlet opening (such as 308) within the housing and positioning the airborne filtering inlet opening in a first location proximate an outside diameter of the disc. The embodiments further include providing an airborne filtering outlet opening (such as 310) within the housing and positioning the airborne filtering outlet opening in a second location proximate the outside diameter of the disc, the first location being displaced along the outside diameter from the second location and providing an airborne filtering path (such as 306), nearly the length of the disc, within the housing, and positioning the airborne filtering path so as to provide airborne filtering communication between the airborne filtering inlet opening and the airborne filtering outlet opening away from the disc.

Some embodiments include that forming the housing (such as 300) further comprises forming the housing so as to include a filter support cavity (such as 304) and a disc support cavity (such as 302). The embodiments further include that operatively securing the disc within the housing further comprises operatively securing the disc (such as 109)

within the disc support cavity of the housing. The embodiments further include that providing an airborne filtering path (such as 306) further comprises providing an airborne filtering path that generally extends around an outer proximity of the filter support cavity.

Some embodiments further comprise a step of operatively suspending a disc head slider (such as 110) over a surface of the disc (such as 107), and wherein positioning the airborne filtering outlet opening (such as 310) further comprises positioning the airborne filtering outlet opening in a position that is generally away from the disc pack (such as 106) region.

An embodiment further includes positioning the airborne filtering inlet opening (such as 308) further comprises positioning the airborne filtering inlet opening in a position that is generally away from the disc pack (such as 106) region.

In some embodiments a disc drive (such as 100), comprises a rotatable storage disc (such as 107), a filter (such as 130), a base support member (such as 102) for supporting the disc (such as 107) and filter (such as 130); and means for guiding airborne filtering within the base support member (such as 102) during operation of the disc drive.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the air filtering channel system while maintaining substantially the same functionality without departing from the scope and spirit of the present invention. In addition, although the preferred embodiment described herein is directed to an air filtering channel system for a magnetic disc drive, it will be appreciated by those skilled in the art that the teachings of the present invention can be applied to an optical drive, without departing from the scope and spirit of the present invention.

What is claimed is:

1. A base support member for a storage device, the base support member having a short side and a long side, the base support member comprising:
   a first structural portion defining a disc support cavity configured to house and support a spinning disc;
      a second structural portion defining a filter support cavity configured to house and support a filter, and an airborne filtering channel having an inlet opening positioned in a first location proximate the disc support cavity and an outlet opening positioned in a second location proximate the disc support cavity, wherein the airborne filtering channel is configured to receive a flow of air from the spinning disc at the inlet opening, direct the flow of air across the filter and to discharge the flow of air at the outlet opening in a direction generally away from the spinning disc; and
      wherein if a line was drawn parallel to the short side of the base support member and through the center of a disc spinning in the disc support cavity, then the filter would be positioned on one side of the line and the outlet opening would be positioned on the other side of the line.

2. The base support member of claim 1, wherein the second structural portion compnses:
   a first wall having an inwardly facing surface; and
   a second wall having an outwardly facing surface, the outwardly facing surface being spaced apart from and facing the inwardly facing surface, the inwardly and outwardly facing surfaces cooperating to form walls of the airborne filtering channel therebetween.

3. The base support member of claim 2, wherein the first wall is integrally formed as part of the base support member.

4. The base support member of claim 2, wherein the second wall is part of a protrusion, the protrusion being an integrally formed part of the base support member.

5. The base support member of claim 2, wherein the second wall is part of a protrusion, the protrusion being attached to the base support member.

6. The base support member of claim 1, wherein:
   the filter support cavity has a filter side and a clear side;
   the inlet opening of the airborne filtering channel is generally positioned proximate the disc support cavity on one of the filter and clear sides of the filter support cavity; and
   the outlet opening of the airborne filtering channel is generally positioned proximate the disc support cavity on the other of the filter and clear sides of the filter support cavity.

7. The base support member of claim 1, wherein the inlet opening is aerodynamically shaped to encourage a pattern of airborne filtering from the spinning disc into the airborne filtering channel.

8. The base support member of claim 1, wherein the inlet opening includes a shroud portion.

9. A storage device comprising:
   a base support member having a short side and a long side, the base support member comprising:
      a first structural portion defining a disc support cavity configured to house and support a spinning disc; and
      a second structural portion defining a filter support cavity configured to house and support a filter, and an airborne filtering channel having an inlet opening positioned in a first location proximate the disc support cavity and an outlet opening positioned in a second location proximate the disc support cavity, wherein the airborne filtering channel is configured to receive a flow of air from the spinning disc at the inlet opening, direct the flow of air across the filter and to divert the flow of air at the outlet opening in a direction that is generally not toward the disc support cavity;
   a disc supported within the disc support cavity, having an outside diameter and being rotatable about a central axis; and
   wherein if a line was drawn parallel to the short side of the disc support member and through the central axis, then the filter would be positioned on one side of the line and the outlet opening would be positioned on the other side of the outlet opening.

10. The storage device of claim 9, wherein the filter support cavity is generally disposed within the airborne filtering channel.

11. The storage device of claim 10, wherein:
   the filter support cavity has a filter side and a clear side;
   the inlet opening of the airborne filtering channel is generally positioned proximate the outside diameter of the disc on one of the filter and clear sides of the filter support cavity; and the outlet opening of the airborne filtering channel is generally positioned proximate the outside diameter of the disc on the other of the filter and clear sides of the filter support cavity.

12. The storage device of claim 9, wherein the inlet opening is aerodynamically shaped to encourage a pattern of airborne filtering from the spinning disc into the airborne filtering channel.

13. The storage device of claim 9, wherein the inlet opening includes a shroud portion.

14. A method of channeling air flow created by a disc that is configured to rotate within a disc support cavity located within a housing of a storage device, wherein the channeling directs the air flow through a filter, and wherein the housing includes a short side and a long side, the method comprising:
   providing an airborne filtering inlet opening within the housing and positioning the airborne filtering inlet opening in a first location proximate an outside diameter of the disc;
   providing an airborne filtering outlet opening within the housing and positioning the airborne filtering outlet opening in a second location proximate the outside diameter of the disc, the first location being displaced along the outside diameter from the second location;
   providing an airborne filtering path within the housing, and positioning the airborne filtering path so as to provide airborne filtering communication between the airborne filtering inlet opening and the airborne filtering outlet; and
   wherein if a line was drawn parallel to the short side of the housing, then the filtering inlet opening would be positioned on one side of the line and the filtering outlet opening would be positioned on the other side of the line.

15. The method of claim 14 further comprising a step of operatively suspending a disc head slider over a surface of the disc, and wherein positioning the airborne filtering outlet opening further comprises positioning the airborne filtering outlet opening so as to divert airplow in a direction that is generally away from the disc head slider.

* * * * *